«12» United States Patent
Sawyer et al.

(10) Patent No.: US 8,641,134 B2
(45) Date of Patent: Feb. 4, 2014

(54) AIR DUCTS FORMED IN AUTOMOTIVE STRUCTURAL MEMBERS

(75) Inventors: Robert S. Sawyer, Farmington Hills, MI (US); Mukesh Kumar, Canton, MI (US); Martha E. Nefcy, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 43 days.

(21) Appl. No.: 13/437,423

(22) Filed: Apr. 2, 2012

(65) Prior Publication Data

US 2013/0257106 A1  Oct. 3, 2013

(51) Int. Cl.
*B60H 1/24* (2006.01)

(52) U.S. Cl.
USPC ............ 296/208; 454/142; 264/521; 264/573

(58) Field of Classification Search
USPC ............ 296/190.09, 208; 454/137, 141, 142, 454/144, 151; 264/267, 503, 510, 512, 520, 264/521, 523, 573
See application file for complete search history.

(56) References Cited

U.S. PATENT DOCUMENTS

| 3,958,582 | A |   | 5/1976 | Noda et al. | |
|---|---|---|---|---|---|
| 4,269,890 | A |   | 5/1981 | Breitling et al. | |
| 4,432,213 | A | * | 2/1984 | Katahira et al. | 62/239 |
| 4,711,159 | A | * | 12/1987 | Armbruster | 454/137 |
| 5,968,431 | A | * | 10/1999 | Ang et al. | 264/171.26 |
| 6,273,494 | B1 | * | 8/2001 | Beigel | 296/190.02 |
| 6,422,575 | B1 |   | 7/2002 | Czaplicki et al. | |
| 6,561,562 | B1 |   | 5/2003 | Hesch | |
| 6,685,262 | B1 | * | 2/2004 | Tiesler et al. | 296/214 |
| 7,296,847 | B2 |   | 11/2007 | Czaplicki et al. | |
| 8,128,161 | B2 | * | 3/2012 | Yang et al. | 296/208 |
| 2005/0285433 | A1 | * | 12/2005 | Baudouin | 296/208 |
| 2007/0123157 | A1 |   | 5/2007 | Shah et al. | |
| 2009/0191396 | A1 |   | 7/2009 | Swan et al. | |

\* cited by examiner

*Primary Examiner* — Glenn Dayoan
*Assistant Examiner* — Jason S Daniels
(74) *Attorney, Agent, or Firm* — Vichit Chen; MacMillan, Sobanski & Todd, LLC

(57) ABSTRACT

An air duct for an automotive vehicle is blow molded with an elongated, hollow structural member to be used as a portion of a body of the vehicle. The structural member has an inner wall defining an elongated cavity communicating with first and second access holes at respective longitudinal positions along the structural member. A parison comprised of a thermally insulating material is inserted into the internal cavity. A source of inflation gas is connected to a mouth portion or the parison. The parison is heated and inflated within the internal cavity to an expanded shape to form the air duct disposed against the inner wall and spanning the first and second access holes. The air duct at one of the access holes is configured as an air inlet. The air duct at the other one of the access holes is configured as an air outlet.

19 Claims, 3 Drawing Sheets

AIR DUCTS FORMED IN AUTOMOTIVE STRUCTURAL MEMBERS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to air ducts for automotive heating, ventilating, and air conditioning (HVAC) systems, and, more specifically, to forming an air duct inside a structural body member of an automotive vehicle.

In a typical automotive HVAC system, a main blower with one or more small auxiliary blowers are used to create a climate system air flow. The air flow is directed by concealed ducts to various registers in the passenger cabin. For example, the air flow may be directed to a general region of the cabin (as with a floor register), directly onto a passenger seating position (as with a dashboard register), or onto the glass windows for defogging.

The packaging of ducts within the available interior space can be a challenge. For example, it may be desirable to direct an air flow from above the bottom base line of the windows (i.e., from a location above the upper edge of the doors or instrument panel) either for the purpose of defogging the window glass or to provide a direct cooling air flow onto the face of a passenger. Conventional ducts have often been installed as distinct elements on the outside of the body frame or other structural elements such as a roof pillar. The duct is then covered with a finishing trim piece to conceal it when passing through visible areas such as a roof pillar of a door sill. However, thinner roof pillars are often desirable for styling purposes. Thus, improved vehicle styling, overall weight reduction, and efficient use of packaging space can be achieved by placing an air duct inside the hollow interior of a roof pillar.

A typical roof pillar or other structural member that could serve to contain an air duct may be typically made of stamped or hydroformed metallic bodies. Such metallic bodies have insufficient heat insulative properties to be used as HVAC ducts. Inserting a prefabricated air duct into a formed structural member may be impractical due to the irregular shapes of the structural member and due to the additional labor that would be involved. It is also known to apply an insulated coating to the interior of a structural member in order to convert a structural member such as a roof pillar into an HVAC duct. However, the use of coatings has had limited success because of limitations relating to the forming of a coated structural member, requirements for expensive materials and/or processing, and an inability to partition off only a portion of the structural member for use as a duct.

SUMMARY OF THE INVENTION

In one aspect of the invention, a method is provided for making an air duct for an automotive vehicle. An elongated, hollow structural member is provided for a portion of a body of the vehicle, wherein the structural member has an inner wall defining an elongated cavity communicating with first and second access holes at respective longitudinal positions along the structural member. A parison is inserted into the internal cavity, wherein the parison is comprised of a thermally insulative material and has a bladder portion and a mouth portion. A source of inflation gas is connected to the mouth portion. The parison is heated and inflated within the internal cavity to an expanded shape to form the air duct disposed against the inner wall and spanning the first and second access holes. The air duct at one of the access holes is configured as an air inlet. The air duct at the other one of the access holes is configured as an air outlet.

DETAILED DESCRIPTION OF PREFERRED EMBODIMENTS

Figure 1:
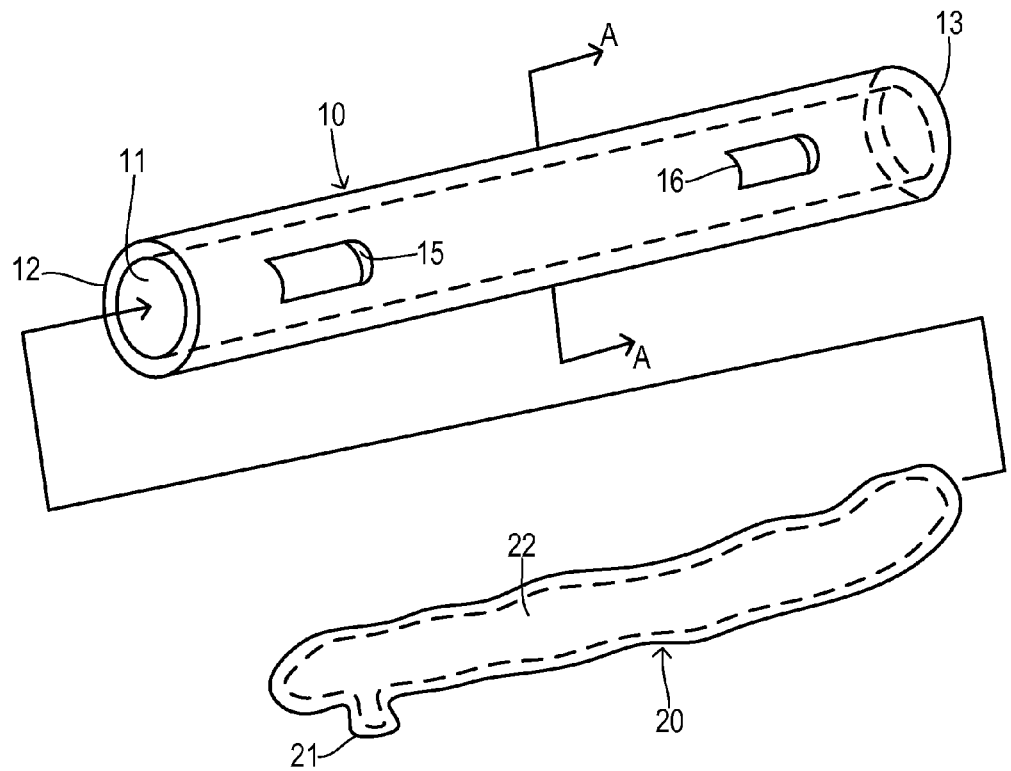
FIG. 1 is a perspective view of a structural member and a parison of the present invention prior to insertion into the structural member.

The present invention overcomes the disadvantages of the prior art by creating a duct from insulative material inside the pre-formed structural member by using the structural member as a mold in a blow-molding operation that creates the duct. Referring now to FIG. 1, a structural member 10 is in the form of an elongated, hollow tube with an inner wall surface 11 defining an elongated cavity. Structural member 10 has first and second ends 12 and 13, each of which can be either open or closed. Structural member 10 may be comprised of a hydroformed tube, stamped sections that are welded together, or can be formed by any other conventional techniques. Structural member 10 is shown with a first access hole 15 and a second access hole 16 passing through wall 11 to communicate with the internal cavity. In other embodiments of the invention, the access holes may be provided by openings in ends 12 and 13 instead of being provided by openings that are cut or otherwise formed in an intermediate portion of structural member 10. Structural member 10 may typically include a curved or other complex end-to-end shape rather than being straight as shown in FIG. 1. In any event, first and second access holes 15 and 16 are located at respective longitudinal positions along structural member 10 in order to provide at least one airflow inlet and one airflow outlet.

A parison 20 capable of blow molding and having a mouth portion 21 and a bladder portion 22 is inserted into the internal cavity of structural number 10 in order to form the air duct of the present invention. Parison 20 functions like a balloon which is placed inside structural member 10 in an original non-inflated state and is then expanded using structural member 10 as a mold to constrain the expansion of parison 20, resulting in the formation of a duct within a desired portion of structural number 10. Parison 20 is comprised of a thermally insulative material, preferably a polymer such as polyurethane, polypropylene, and/or polyethylene. Most preferably, a foamed polyurethane may be employed. Parison 20 is sufficiently narrow and flexible to be easily inserted into a structural member 10 that may have various end-to-end shapes including curves and/or bends.

Figure 2:
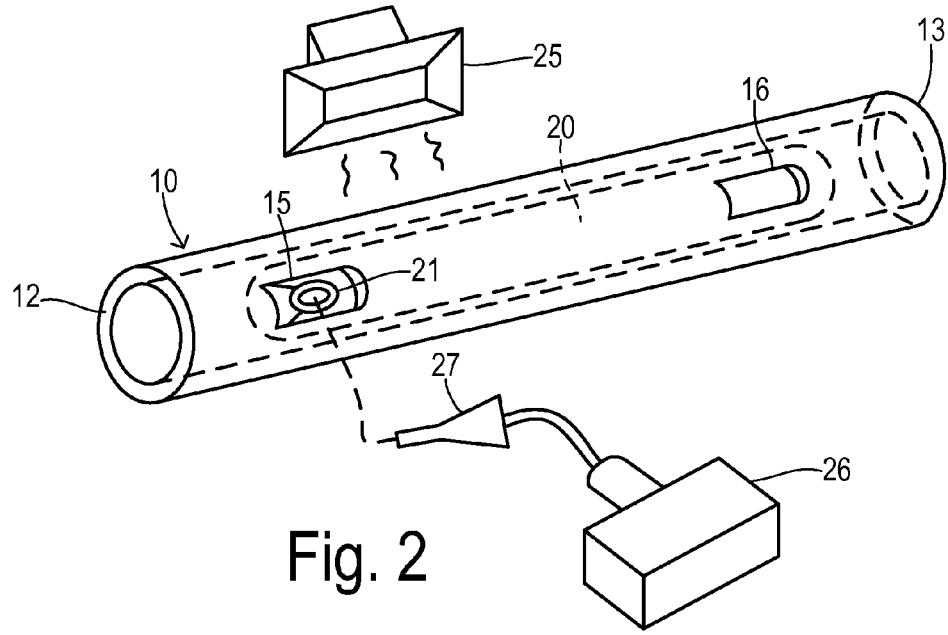
FIG. 2 is a perspective view showing apparatus for heating and inflating the parison after insertion into the structural member.

As shown in FIG. 2, parison 20 has been inserted into structural member 10 so that mouth portion 21 is accessible via first access hole 15. Parison 20 may have been inserted via end 12 or access hole 15. A radiant heat source 25 may be employed for heating parison 20 before and/or after insertion into structural member 10. A compressed gas source 26 provides a source of inflation gas via a nozzle 27 after nozzle 27 is sealed to mouth portion 21. The inflation gas may also be heated if necessary. By the application of heat and the injection of inflation gas, parison 20 is expanded into a shape for forming the air duct such that the walls of parison 20 expand against the inner wall of the structural member. Upon expansion, parison 20 spans the first and second access holes. After the air duct and structural member have cooled, an air inlet is configured at one of access holes 15 and 16 and an air outlet is configured at the other one of access holes 15 and 16.

Figure 3:
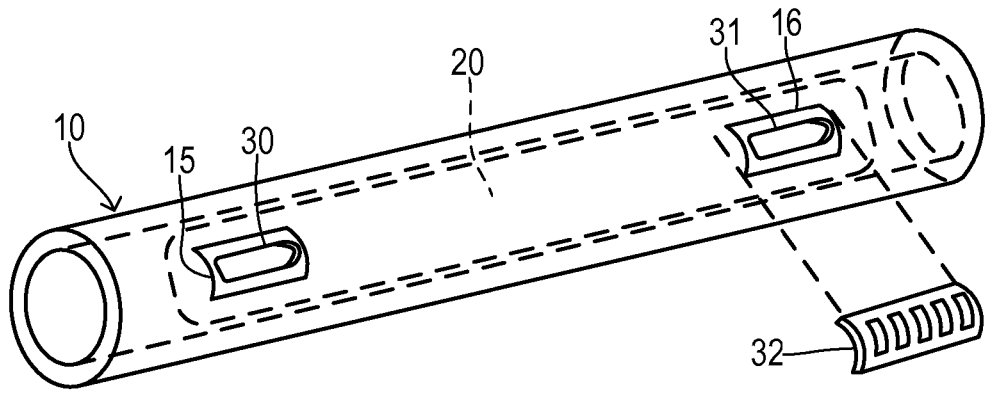
FIG. 3 is a perspective view of a structural member with an air duct formed therein.

FIG. 3 shows parison 20 after expansion into the air duct contacting the inner wall of structural member 10. Appropriate holes 30 and 31 are configured in the air duct through access holes 15 and 16, respectively, to provide the air inlet and outlet. Hole 31 may be further configured as an air outlet by mounting a diffuser plate 32 onto structural member 10 in a position covering holes 16 and 31. Hole 30 may be configured as an air inlet by coupling to an air duct that passes along an airflow from the blower (not shown), e.g., an air duct that is concealed behind an instrument panel.

Figure 4:
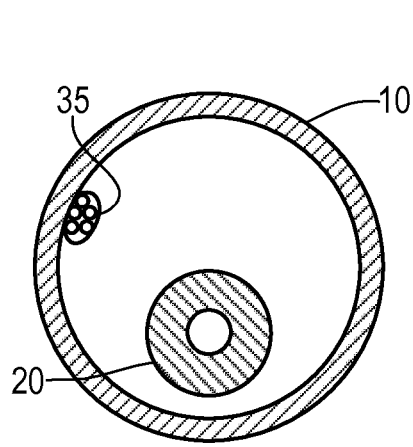
FIG. 4 is a cross section showing a parison inserted within a structural member prior to inflation.
Figure 5:
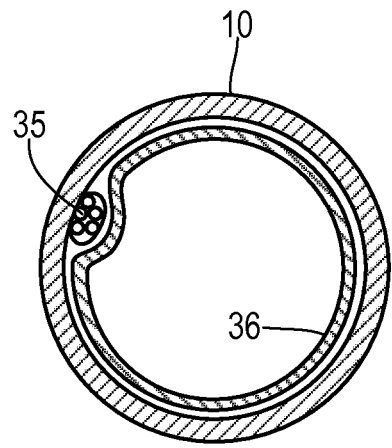
FIG. 5 is a cross section showing the parison of FIG. 4 after inflation.

FIG. 4 shows a cross-section taken at the position of line A-A in FIG. 1 with parison 20 inserted into structural member 10. In the present invention, structural member 10 may also have other items traversing the interior cavity, such as a wire bundle 35 that is using structural member 10 as a conduit. FIG. 4 shows parison 10 in its initial state, and FIG. 5 shows the air duct after expansion. In particular, a resulting air duct 36 is disposed against an interior wall of structural member 10 and also against wire bundle 35.

Figure 6:
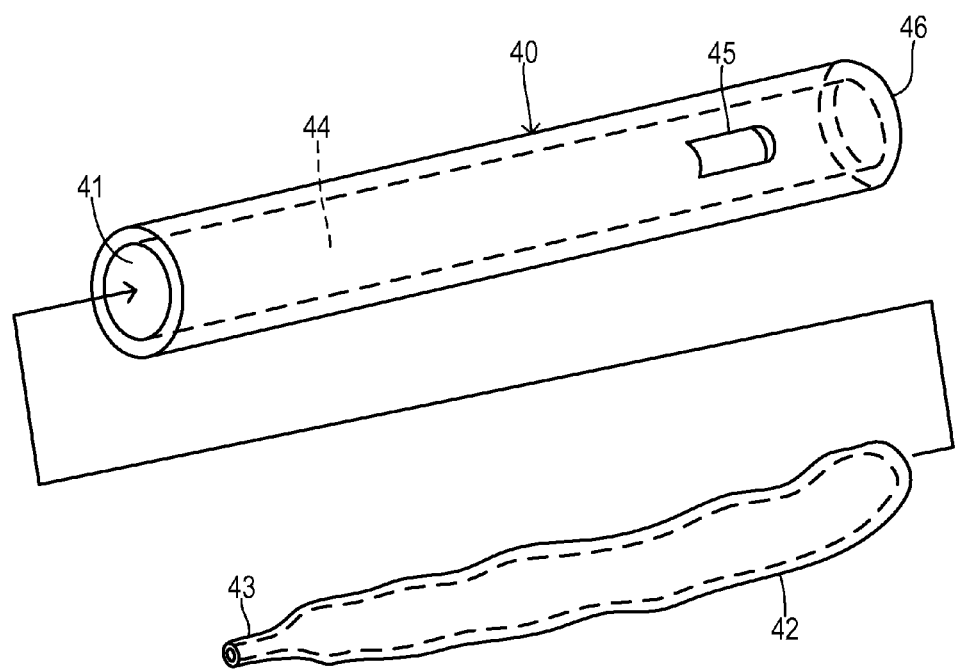
FIG. 6 is a perspective view showing insertion of the parison from an end of the structural member.

FIG. 6 shows an embodiment wherein an opening at an end of the structural member is employed as an access hole. More specifically, a structural member 40 has a first opened end 41 for receiving a parison 42 with a mouth portion 43 at one distal end. Parison 42 is inserted into a cavity 44 within structural member 40 via open end 41. An access hole 45 may be provided at a position longitudinally separated from open end 41 so that after inflation, parison 42 spans the distance from open end 41 to access hole 45. Access hole 45 can be formed either before or after expansion of parison 42 into the desired air duct. Alternatively, an open end 46 of structural member 40 can be employed as the second access hole, especially when an air duct fully traverses structural member 40.

Figure 7:
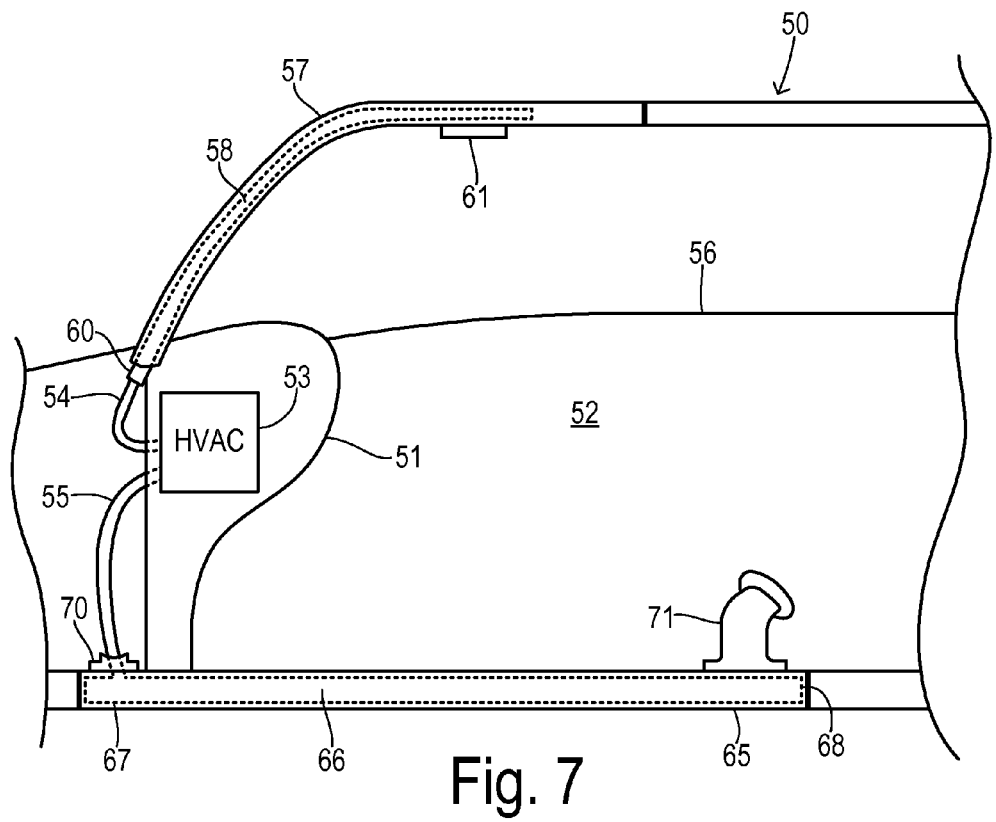
FIG. 7 shows an automotive vehicle body with structural members having air ducts of the present invention.

FIG. 7 illustrates use of the present invention in a vehicle body 50. An instrument panel 51 in a passenger cabin 52 contains an HVAC system 53 with a blower for providing air flow to air distribution ducts 54 and 55. In order to provide an air flow above a window baseline 56, a roof pillar 57 comprised of an elongated-hollow tube is provided with an air duct 58 formed by expanding a parison as described above. An air inlet 60 is configured at one end of duct 58 for coupling with duct 54. An air outlet 61, such as a diffusion register, is configured at the opposite end of air duct 58.

The present invention may be used in other areas of a vehicle body such as a door sill structural member 65. An air duct 66 has been formed in sill structural member 65 between an air inlet end 67 and an air outlet end 68. A coupler 70 is mounted to sill 65 at air inlet end 67. Coupler 70 extends outwardly from the corresponding access hole and connects with duct 55. An air outlet access hole at opposite end 68 has a register 71 covering the access hole and delivering an airflow to a rear seat area of passenger cabin 52.

What is claimed is:

1. A method of making an air duct for an automotive vehicle, comprising the steps of:
   providing an elongated, hollow structural member for a portion of a body of the vehicle, wherein the structural member has an inner wall defining an elongated cavity communicating with first and second access holes at respective longitudinal positions along the structural member;
   inserting a parison into the internal cavity, wherein the parison is comprised of a thermally insulating material and has a bladder portion and a mouth portion;
   connecting a source of inflation gas to the mouth portion;
   heating and inflating the parison within the internal cavity to an expanded shape constrained by the inner wall to form the air duct disposed against the inner wall and spanning the first and second access holes, wherein the expanded shape is retained upon cooling;
   configuring the air duct at one of the access holes as an air inlet; and
   configuring the air duct at the other one of the access holes as an air outlet.

2. The method of claim 1 wherein the mouth is disposed in the first access hole during the heating and inflation step.

3. The method of claim 1 wherein the mouth is disposed remotely from the first and second access holes during the heating and inflation step, and wherein the method further comprises the step of sealing the mouth closed after the heating and inflation step.

4. The method of claim 1 wherein at least one of the access holes is cut into the structural member after the step of heating and inflating the parison.

5. The method of claim 1 wherein the thermally insulating material is comprised of a polymer.

6. The method of claim 5 wherein the polymer is comprised of polyurethane foam.

7. The method of claim 5 wherein the polymer is comprised of polypropylene.

8. The method of claim 5 wherein the polymer is comprised of polyethylene.

9. The method of claim 1 wherein the step of configuring an air inlet is comprised of mounting a coupler to the structural member extending outwardly from the one access hole.

10. The method of claim 1 wherein the step of configuring an air outlet is comprised of mounting a diffuser to the structural member covering the other one of the access holes.

11. The method of claim 1 wherein the structural member comprises a roof pillar of the vehicle.

12. The method of claim 1 wherein the structural member comprises a sill of the vehicle.

13. Apparatus for an automotive vehicle, comprising:
   an elongated, hollow structural member for a portion of a body of the vehicle, wherein the structural member has an inner wall defining an elongated cavity communicating with first and second access holes at respective longitudinal positions along the structural member;
   an air duct retained in the structural member comprised of a thermally insulating material initially placed in the elongated cavity as a parison with a bladder portion and a mouth portion, wherein the air duct is disposed against the inner wall and spans the first and second access holes as a result of heating and inflating the parison within the internal cavity to an expanded shape, wherein the expanded shape is retained upon cooling defining the air duct;

an air inlet at one of the access holes; and an air outlet at the other one of the access holes.

14. The apparatus of claim 13 wherein the thermally insulating material is comprised of a polymer.

15. The apparatus of claim 14 wherein the polymer is comprised of polyurethane foam.

16. The apparatus of claim 13 wherein the air inlet is comprised of a coupler mounted on the structural member extending outwardly from the one access hole.

17. The apparatus of claim 13 wherein the air outlet is comprised of a diffuser mounted on the structural member covering the other one of the access holes.

18. The apparatus of claim 13 wherein the structural member comprises a roof pillar of the vehicle.

19. The apparatus of claim 13 wherein the structural member comprises a sill of the vehicle.

* * * * *